Figure 1:
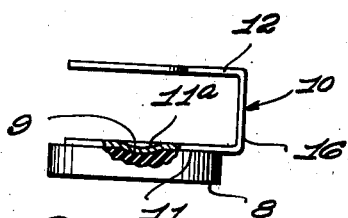

Oct. 13, 1942.  E. A. BERKERY  2,298,338
REPLACEMENT WASHER
Filed March 21, 1941

Inventor
Emmet A. Berkery
By Lacey & Lacey
Attorneys

Patented Oct. 13, 1942

2,298,338

UNITED STATES PATENT OFFICE 2,298,338

REPLACEMENT WASHER

Emmet A. Berkery, Marlboro, N. Y.

Application March 21, 1941, Serial No. 384,571

5 Claims. (Cl. 251—160)

This invention relates to washers and more particularly to an improved replacement washer for use in conjunction with water faucets.

One object of the invention is to provide a replacement washer which may be readily removed from a water faucet when it becomes ineffective in use so that quick replacement may be made.

Another object of the invention is to provide a replacement washer which may be adapted for use with newly manufactured water faucets or with those already in use.

A further object of the invention is to provide a device of this character which will be simple in construction, highly efficient in use and cheap in cost.

Still another object of the invention is to provide a replacement washer which will have longer life than replacement washers of the type now in use.

A further object of the invention is to provide a device of this class which is formed with means for preventing it from becoming accidentally displaced from the shank on which it is mounted.

Still further objects of the invention, not specifically mentioned hereinbefore, will become apparent during the course of the following description.

Figure 4:
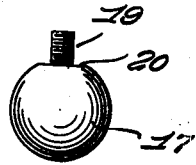
Figure 2:
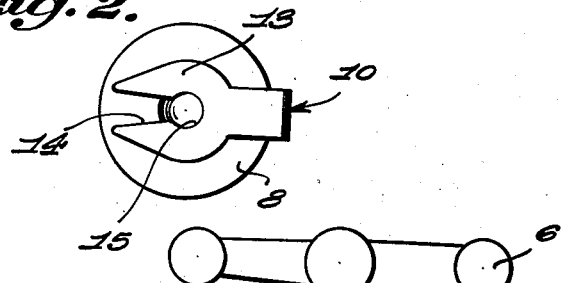
Figure 3:
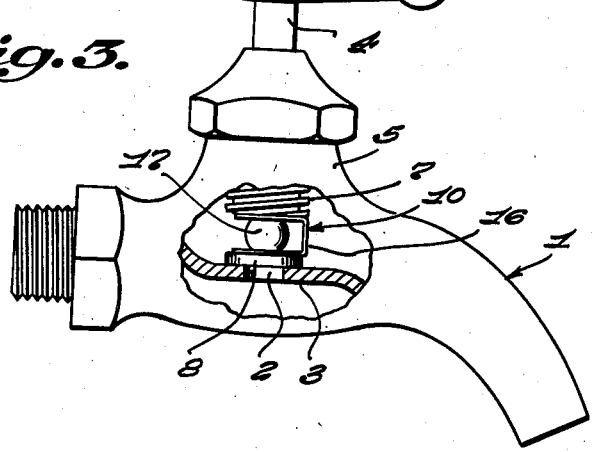

In the drawing:

Figure 1 is a side elevation, partly in section, of my improved replacement washer, Figure 2 is a top plan view of the device, Figure 3 is a side elevation, partly in section, showing my improved replacement washer as it would appear in operative position in a faucet, and Figure 4 is a side elevation showing a slightly modified form of mounting ball.

In the drawing, like numerals of reference will be seen to designate like parts throughout the views.

In the drawing, the numeral 1 indicates in general a faucet which is of conventional construction. The faucet 1 includes a valve opening 2 and a valve seat 3. A valve shank 4 is rotatably mounted in the neck 5 of the faucet and carries a handle 6 at its upper end. The shank 4 is formed with a threaded portion 7.

My improved replacement washer includes a body 8 which is formed of rubber or other suitable material. The body 8 is preferably of circular shape and is of a sufficient size to close the valve opening 2 when overlying said opening, as shown in Figure 3. The body 8 is formed with an axially disposed depression 9, the purpose for which will be set forth in more detail hereinafter. Carried by the body is a substantially U-shaped resilient metal mounting bracket 10. The bracket 10 includes a lower arm 11 which is connected with the upper surface of the body 8 by vulcanizing or by any other suitable method. The arm 11 is formed with a depressed portion 11a which extends into the depression 9 and defines a socket for receiving the lower end portion of the mounting ball, to be described hereinafter. The bracket 10 also includes an upper arm 12 which, as best seen in Figure 2, is formed with an enlarged portion 13 having a slot 14 leading from its forward end inwardly and terminating in a circular opening 15. As will be observed, the slot 14 is reduced in width toward its inner end. The arms 11 and 12 are vertically spaced and are connected by a bight portion 16. As shown, the bight portion is disposed at substantially right angles to the arms 11 and 12 but, if desired, said bight portion may be of arcuate shape.

In order to connect my improved replacement washer with the shank 4 of the faucet 1 for the purpose of placing the replacement washer in operative position, I provide a mounting ball 17 which is of substantially spherical shape. The mounting ball 17 is, in one embodiment of the invention, formed integral with the lower end of the shank 4. However, when it is desired to install my invention in a faucet of the type now in use, wherein a screw is used for holding the old style washer in place, a mounting ball of the type shown in Figure 4 is employed. The mounting ball 17 includes a threaded shank 19 and a flattened shoulder 20. In this embodiment of the invention, the shank 19 is screwed into the opening provided in the lower end of the shank 4 and the shoulder 20 is brought into abutting relation with the flat lower end face of the portion 7 of said shank 4.

When it is desired to place a replacement washer according to my invention in operative position on the shank 4, the device is first moved laterally for engaging the enlarged portion 13 between the lower end of the threaded portion 7 and the upper end of the ball 17, it being understood, of course, that the upper end portion of the ball will be received through the slot 14 and will be finally seated in the opening 15. At the same time, the body 8 will be moved laterally across the lower portion of the ball 17 until the lower end of said ball is caused to engage in the socket formed by the depressed portion 11a. Due to the provision of this socket and to the fact that the bracket 10 is of resilient metal, the device will be limited against accidental displacement from the ball 17. Obviously, the manner of installing the device on a faucet already in use, wherein the mounting ball 17 is employed, will be identical with that wherein the ball is formed integral on the end of the shank 4, as above described.

Attention is particularly called to the fact that my improved replacement washer will not be permitted to rotate with the shank 4 but will be limited to vertical movement toward and away from the seat, except after the lower surface of the body 8 has actually separated from the margin defining said seat. More specifically, in view of the fact that there is a metal to metal connection between the end of the ball 17 and the socket defined by the depression 11ᵃ and a rubber to metal connection between portions of the lower face and the body 8 and the margin defining the opening 2, the friction created by engagement of said body with the margin of said opening will be sufficient to overcome the holding effect of the arm 11 against the ball 17. Therefore, as soon as the body comes into contact with the margin defining the opening, the entire device will be held against rotation while the ball is being rotated and moved downwardly for urging said body into tight engagement with the margin surrounding the opening 2. The advantage for the construction is that wear, such as would be caused by rotatable engagement of the face of the body 8 with the margin defining the seat, will be prevented.

Attention is also directed to the fact that the device is of a diameter no greater than that of the threaded portion 7 to which it is attached. Accordingly, the device may be easily removed along with said threaded portion.

It is desired to call further attention to the fact that my improved replacement washer may be installed without the need of removing screws or other devices, with the result that quick and easy replacement of a worn washer may be effected.

As will be readily understood from the foregoing description, the invention is characterized by the utmost simplicity in construction. Moreover, it is believed that it may be manufactured cheaply in quantity. Although, as stated, the device may be quickly installed on or removed from a faucet, replacement will not often be needed in view of the fact that wear will be reduced to a minimum.

It is believed that further description of the invention is unnecessary.

Having thus described the invention, what is claimed as new is:

1. A replacement washer for water faucets comprising a yieldable body portion and a substantially U-shaped mounting bracket having vertically spaced horizontal arms, the lower one of which is secured to the upper face of said body portion, there being a central opening formed in the upper arm to accommodate a ball mounting, and a slot extending from the free end of said arm and communicating with said central opening.

2. A replacement washer for water faucets comprising a yieldable body portion and a substantially U-shaped mounting bracket having vertically spaced horizontal arms, the lower one of which is secured to the upper face of said body portion, the upper arm being provided with a lateral engagement having a central opening formed therein to accommodate a ball mounting and provided with a slot extending from the free end of said upper arm and communicating with said opening, the walls of the slot converging in the direction of the central opening.

3. A replacement washer for water faucets comprising a yieldable body portion and a substantially U-shaped mounting bracket having vertically spaced horizontally disposed resilient arms, the lower one of which is secured to the upper face of said body portion, there being a central opening formed in the upper arm to accommodate a ball mounting, and a slot extending from the free end of said arm and communicating with the central opening, said lower arm being formed with a depression disposed in alinement with said central opening.

4. A replacement washer for water faucets comprising a yieldable body portion and a substantially U-shaped mounting bracket having vertically spaced horizontally disposed resilient arms, the lower one of which is of less length than the diameter of the yieldable body portion and is secured to the upper face thereof, the upper arm being provided with an enlargement having a central opening formed therein and provided with a slot extending from the free end of the upper arm and communicating with said opening, the walls of the slot converging in the direction of the central opening.

5. A replacement washer for water faucets comprising a substantially circular body portion of yieldable material having a depression formed in the upper face thereof, and a substantially U-shaped mounting bracket having vertically spaced horizontally disposed resilient arms, the lower one of which is secured to the upper face of the body portion and is provided with a depression fitting in the depression of said body portion, the upper arm of the mounting bracket being formed with a central opening to accommodate a ball mounting and having a slot formed therein extending from the free end of the upper arm and communicating with the central opening, the walls of the slot converging in the direction of said central opening.

EMMET A. BERKERY.